Figure 1:
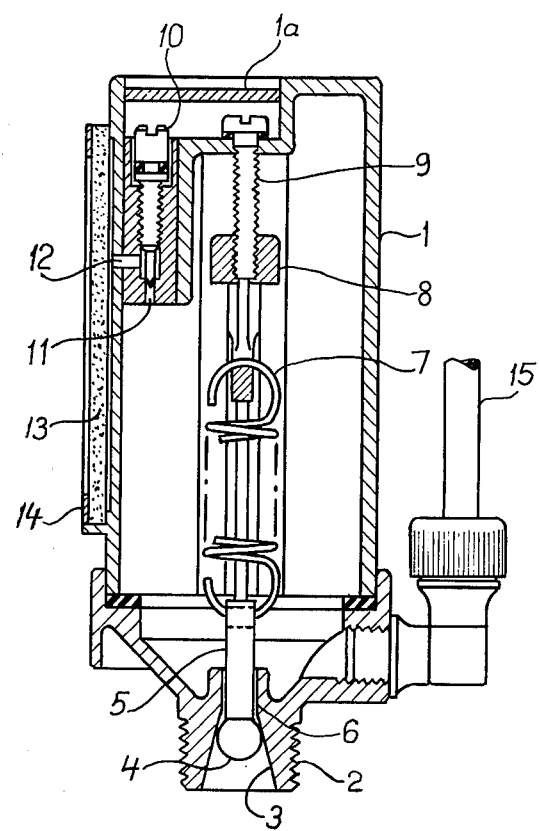

United States Patent
Revesz

[11] 3,934,607
[45] Jan. 27, 1976

[54] CONTROL FOR VACUUM SYSTEM
[75] Inventor: Istvan Revesz, Sodertalje, Sweden
[73] Assignee: Alfa-Laval AB, Tumba, Sweden
[22] Filed: Sept. 3, 1974
[21] Appl. No.: 502,644

[30] Foreign Application Priority Data
  Oct. 11, 1973  Sweden..................731306/73

[52] U.S. Cl............................ 137/489.5; 137/DIG. 8
[51] Int. Cl.............................................. G05D 16/06
[58] Field of Search ..... 137/489, 488, 489.5, 492.5, 137/DIG. 8

[56] References Cited
UNITED STATES PATENTS

| | | | |
|---|---|---|---|
| 356,318 | 1/1887 | Jones | 137/489.5 |
| 2,174,515 | 10/1939 | Hughes | 137/489 X |
| 3,036,778 | 5/1962 | Dillman | 137/489 X |
| 3,357,443 | 12/1967 | Brumm | 137/489.5 X |
| 3,807,439 | 4/1974 | Doe | 137/489.5 |

Primary Examiner—Irwin C. Cohen
Assistant Examiner—Miller Robert J.
Attorney, Agent, or Firm—Cyrus S. Hapgood

[57] ABSTRACT

An indicator senses a deviation from a balance between a force generated by the vacuum level actually prevailing in the vacuum system and a force of constant magnitude permanently acting in the indicator. An air admission valve is connected to the vacuum system, and a connection is provided for transmitting a deviation impulse generated by the indicator to an operating means for controlling the air admission valve under the guidance of the deviation impulse.

7 Claims, 3 Drawing Figures

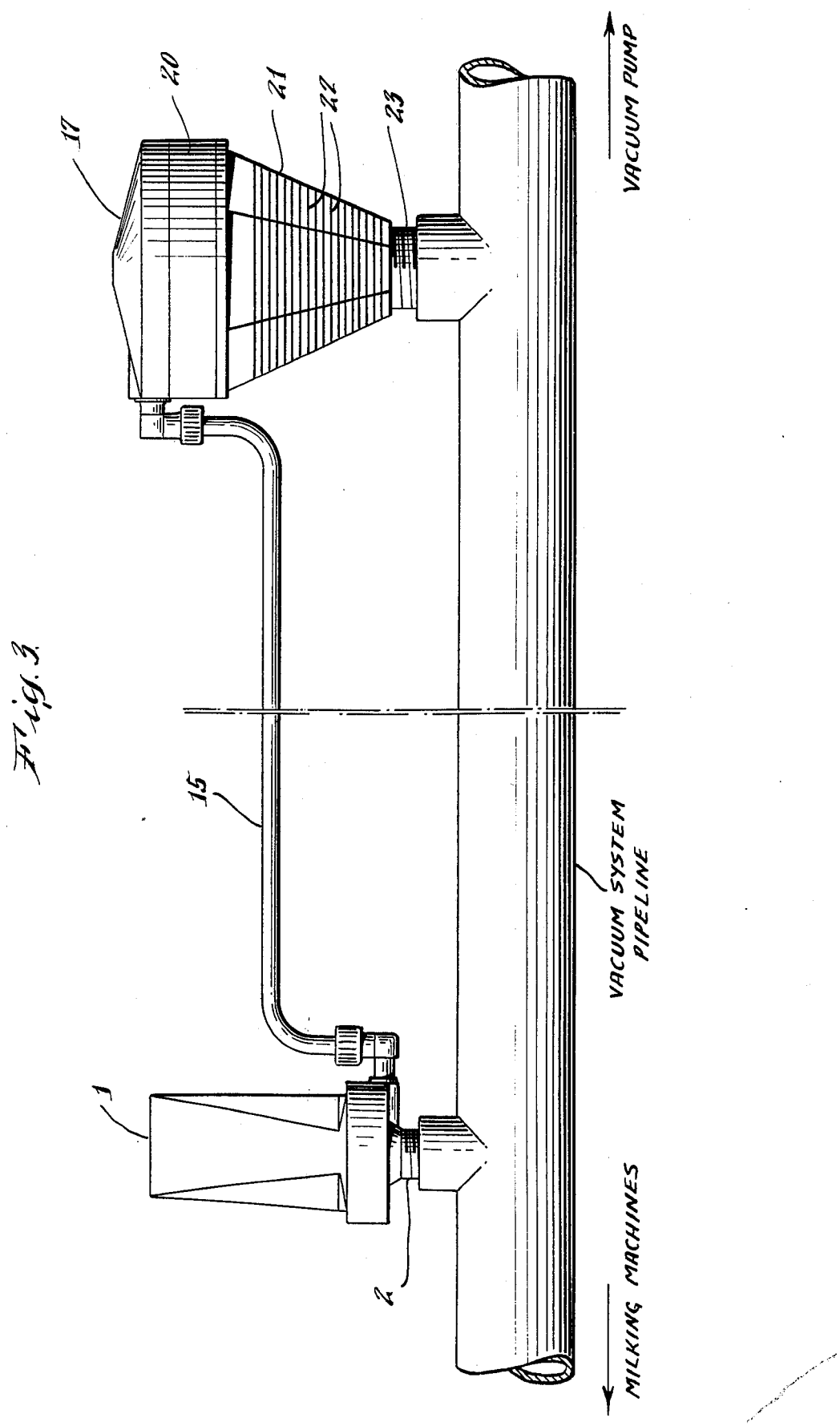

CONTROL FOR VACUUM SYSTEM

The present invention concerns a device for keeping the vacuum level constant in a vacuum system. Such a control device has many useful applications, as in the vacuum system of machine milking plants, since it has proved that a fluctuating milking vacuum level is harmful to the udder health.

The vacuum system in machine milking plants functions in such a way that a varying amount of atmospheric air enters the teat cup clusters, whereas a predetermined amount by volume of expanded air is removed by the vacuum pump. In order to maintain the predetermined vacuum level it is necessary that the air amount supplied and the air amount removed are equal. The vacuum control can be realized in two ways as follows:

1. The conveying capacity of the vacuum pump is adapted continuously to the supplied air amount, as by control of the number of revolutions per minute.

2. The permanent conveying capacity of the vacuum pump is chosen greater than the air admission of the teat cup clusters, and a special valve supplies continuously to the system an amount of air which corresponds to the difference between the conveying capacity of the pump and the air admission of the teat cup clusters.

In practice, the second control method is used. More particularly, an opening between the vacuum system and the surrounding atmosphere is closed by a valve body having a suitable shape. The body is loaded (usually by means of a spring or a weight), so that the vacuum and the mechanical load acting on the body balance each other. If the vacuum is changed, as due to changed admission of air through the teat cup clusters, the force balance is altered and the valve body is displaced. In this way, the uncovering of the opening is changed and the admitted air amount is increased or decreased, until a force balance and thereby the desired vacuum is reached. This design has the following disadvantages:

1. The vacuum acting on the valve body is not necessarily identical to the vacuum of the system, since the air flowing in through the valve has an influence of the vacuum conditions in the vicinity of the valve.

2. The above-mentioned force balance is based on a static load. In reality, the position of the valve body is also influenced by the impulse force of the entering air. This force varies with the flow rate of the entering air, and for this reason the vacuum necessary for maintaining the force balance will also be dependent on the flow rate of the entering air.

3. Small variations of the vacuum level give small adjustment forces acting on the valve body, and these forces are generally consumed by friction and inertia, so that the control effect fails.

4. Designs of this type, where attempts have been made to eliminate the third disadvantage, will be inclined to oscillate and for this reason are unsuitable.

In summary, the prior designs intended for vacuum level control are not able to maintain a constant vacuum level with narrow tolerances. These designs are generally inert or inclined to oscillate and are not able to keep the vacuum level in the part of the vacuum system where it is desirable.

According to the present invention, these disadvantages are avoided by a vacuum control device comprising (1) an indicator for sensing a deviation from a balance between a force generated by the vacuum level actually prevailing in the vacuum system and a force of constant magnitude permanently acting in the indicator, (2) an air admission valve connected to the vacuum system, (3) a connection for transmitting a deviation impulse generated by the indicator, and (4) means for controlling the air admission valve with the guidance of the deviation impulse.

In a suitable embodiment of the invention, the indicator includes a body, such as a valve body or a diaphragm, which in one direction is actuated by the force generated by said vacuum level and in the opposite direction is actuated by said force of constant magnitude, such as a spring or a weight, permanently acting in the indicator. The deviation impulses generated by the movements of the aforementioned body can be transmitted in a pneumatic, hydraulic or electric way to said operating means for control of the air admission valve.

According to a suitable alternative, the valve body of the air admission valve can be a conical sleeve, and the valve seat of the valve can be a sleeve with a corresponding conicity and with a passage for an air through-flow arranged in the valve seat surface. By allowing the respective conical surfaces to form a small angle with the cone axis, the air flowing through said passage strikes the conical surfaces almost at right angles and thereby has only a very small influence on the adjustment position of the conical valve body. If the conical surfaces were cylindrical and arranged with sufficient sealing against each other, there would occur between them friction forces which would counteract the adjustment accuracy of the valve.

In order to prevent the valve, consisting of conical sleeves, from sticking in incorrect positions, the operating means preferably include a rod which is connected to the valve body, which is coaxial with the latter, which transmits to the valve body an adjustment force dependent on the deviation impulses, and which can be articulated in relation to the valve body in different directions.

In a preferred embodiment of the invention, the indicator has a valve body, adapted to be actuated as stated earlier, and also has a housing whose interior communicates partly with the outer atmosphere through a throttling opening and partly through a pipeline with a closed chamber in the air admission valve, which chamber is confined by a displaceable wall, such as a piston or diaphragm, having a movement-transmitting connection with the valve body of the air admission valve and whose outside is exposed to the atmospheric pressure. Thus, the vacuum prevailing in the vacuum system is utilized so as to transmit pneumatically the deviation impulses from the indicator to the air admission valve. The atmospheric air entering through the throttling opening is necessary to maintain the functional capability of the transmission of the deviation impulses, which takes place through said pipeline. The air which has entered through the throttling opening is discharged to the vacuum system through the indicator valve.

By making the active area of the displaceable wall appreciably greater than the active area of the air admission valve, an amplification of the deviation impulses is obtained, so that the latter generate the adjustment forces necessary for the control of the air admission valve.

The force permanently acting in the indicator is advantageously made adjustable as to its magnitude, so that the device according to the invention can be adjusted to maintain a certain desired vacuum level. Likewise, it is suitable to make the throttling opening of the indicator housing adjustable, as by means of a needle valve, so that the air admission through this opening can be adapted to the volume of the pipeline transmitting the deviation impulses. The vacuum level can to a certain degree be influenced by the adjustment of the needle valve.

A suitable embodiment of the valve, arranged in the indicator, is characterized in that the surface of the valve body is spherical and the surface of the valve seat is conical in the area where the valve body and the valve seat contact each other in the closing position of the valve. The active area of this valve will thus be constant, and for this reason the changes of the vacuum level of the vacuum system will be the only changeable factor. Furthermore, a narrow slot can be arranged between the valve body spindle and a surface guiding the spindle. This avoids such great amounts of air flow into the vacuum system that they unfavorably influence the control of the vacuum level, since the desired control accuracy requires that this control take place only by means of said air admission valve.

Figure 2:
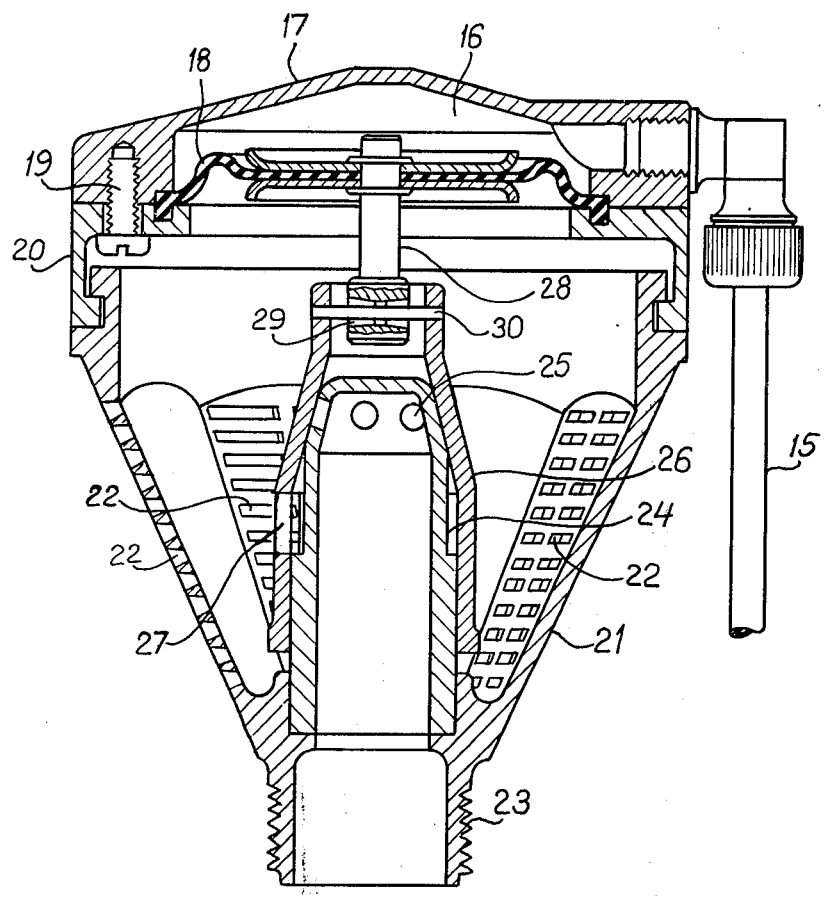

The invention is described in more detail below with reference to the accompanying drawings, in which FIG. 1 and FIG. 2 are vertical sectional views of an indicator and an air admission valve, respectively, in one embodiment of the invention chosen by way of example, and FIG. 3 is a schematic view showing the assemblies of FIGS. 1 and 2 connected together and showing the connection of each of these assemblies to the vacuum system.

In FIG. 1, an indicator housing 1 is provided at the bottom with a threaded holder 2, which can be connected to a vacuum system (not shown). In the holder is a conical valve seat surface 3 coacting with a spherically shaped valve body 4. The latter has a spindle 5, which passes with a small play 6 through a cylindrical part of the valve seat surface. The valve spindle is pulled upwards by a spring 7 suspended in a spring stretcher 8. The latter is supported from the top of the indicator housing by means of a screw 9 threaded into the spring stretcher. A needle valve 10 is provided which, by being screwed, can control a throttling opening 11. An air admission opening 12 in the wall of the indicator housing communicates with the needle valve and is covered by an air filter 13. This filter, which can be detached, is located in a holder 14.

The interior of the indicator housing is connected through a pipeline 15 to a chamber 16 in the upper part of the air admission valve shown in FIG. 2. This chamber is defined by a cover 17 and a diaphragm 18. The latter is clamped by screws 19 between the cover 17 and an annular part 20. A mainly conical part 21 is fastened by means of a bayonet mount to the part 20. Slots 22 are provided in the wall of the conical part and serve for admission of atmospheric air into the interior of the part 21. The latter has a threaded holder 23 which can be connected with the same vacuum system as the system mentioned earlier. A sleeve 24, which is slightly conical at its upper part, extends upwards from the holder 23. The sleeve is closed at its top but has in its conical part holes 25 oriented radially. In the closed position of the valve, the holes 25 are closed by another sleeve 26. The two sleeves are coaxial with each other, and the inside of the sleeve 26 has in the area of the holes 25 the same conicity as the outside of the sleeve 24. The sleeve 26 is open at its top and has a lateral opening 27. A rod 28 connects the diaphragm 18 with the upper part of the sleeve 26. Due to a pre-stress of the diaphragm 18, the latter strives to press the sleeve 26 downwards to closing position. The rod 28 can articulate in different directions in relation to the sleeve 26, and for this purpose the rod is provided at its lower end with a hole 29 passing through the rod in its transverse direction and widening conically towards both ends and loosely surrounding a pin 30, which is fixed in the upper end of the sleeve 26.

In the operation of the device, the vacuum level which is to be maintained in the vacuum system is adjusted by means of a corresponding adjustment of the tension of the spring 7, which takes place by turning the screw 9. The air admission into the indicator housing is controlled by means of the needle valve 10 in view of the local formation of the vacuum system. A sealing plate 1a prevents undue actuation of the screw 9 and the needle valve 10, after these have been adjusted by an installer. In the normal operation condition, all air entering through the needle valve is sucked away through the valve 3–6. If the vacuum level in the vacuum system increases, the valve body 4 is sucked downwards, and the increased vacuum level propagates through the pipeline 15 to the chamber 16 in the air admission valve. The diaphragm 18 is thus lifted and thereby uncovers to a corresponding degree the holes 25. Air then flows in an increased amount into the holes, partly from above through the upper end of the sleeve 26 and partly through the lateral opening 27 of the sleeve. By this way of flowing, the influence of the air flow in the axial direction of the sleeve 26 is mainly eliminated, thereby avoiding a disturbance of the control accuracy. The air admission into the vacuum system via the holder 23 restores the vacuum level, adjusted by the spring 7. Due to the movability of the joint 29–30 in different directions, the sleeve 26 will be self-centering in relation to the sleeve 24, so that the sleeves 24 and 26 will not stick to each other during the diaphragm movements.

The device according to the invention can be used not only for maintaining a constant vacuum level but also for maintaining a constant difference between a lower and a higher vacuum level.

I claim:

1. In combination with a vacuum system, a device for controlling the vacuum level in said system, said device comprising an indicator for sensing a deviation from a balance between a force generated by the vacuum level actually prevailing in said system and a force of constant magnitude permanently acting in the indicator, said indicator being operable to generate a deviation impulse corresponding to said deviation, an air admission valve connected to the vacuum system and having a closed chamber, and means associated with the indicator for transmitting said deviation impulse to said closed chamber for controlling the air admission valve under the guidance of said deviation impulse, the indicator including a housing having an interior and also having a throttled air admission opening through which said interior communicates with the outer atmosphere, said housing also having a throttled air discharge passage through which said interior communicates with the vacuum system, said interior also communicating through said transmitting means with said closed chamber of the air admission valve, the indicator also including a valve body actuated by said two forces for controlling the balance between the air admission into and the air discharge from the housing interior, the air admission valve including a space communicating with atmosphere and also including a valve member for controlling air flow from said space to the vacuum system, the air admission valve also including a displaceable wall having a movement-transmitting connection with said valve member, said wall having one side subjected to the pressure in said closed chamber and having its opposite side subjected to the pressure in said space.

2. The combination of claim 1, in which said valve member of the air admission valve is a conical sleeve, the air admission valve also including a sleeve member forming a seat for the valve member and having a conicity corresponding to the conicity of said conical sleeve, said seat having a passage for through-flow of air from said space to said vacuum system.

3. The combination of claim 2, in which said movement-transmitting connection includes a rod connected to said valve member and coaxial therewith, said rod being articulated for movements in different directions relative to the valve member and being operable to transmit to the valve member an adjustment force dependent on the deviation impulses.

4. The combination of claim 1, in which said transmission means include a pipeline connecting the interior of the indicator housing to said closed chamber of the air admission valve.

5. The combination of claim 1, in which the displaceable wall has an effective area substantially greater than the effective area of said air admission valve member.

6. The combination of claim 1, comprising also means for adjusting said throttled air admission opening of the indicator housing.

7. The combination of claim 1, in which said valve body of the indicator has a spherical surface, the indicator having a valve seat coacting with said valve body and which is conical in the region where the valve body and valve seat contact each other in the closing position of the valve body.

* * * * *